United States Patent [19]
Fenne

[11] 3,763,832
[45] Oct. 9, 1973

[54] INJECTION SYSTEM FOR INTERNAL COMBUSTION ENGINE

[75] Inventor: Ivor Fenne, Greenford, England

[73] Assignee: C. A. V. Limited, Birmingham, England

[22] Filed: Nov. 5, 1971

[21] Appl. No.: 196,162

[30] Foreign Application Priority Data
Nov. 5, 1970 Great Britain.................. 52,703/70

[52] U.S. Cl. .............................. 123/25 C, 123/32 R
[51] Int. Cl. F02d 19/12, F02m 43/00, F02m 43/04
[58] Field of Search.............. 123/25 R, 25 C, 25 D, 123/25 J, 25 M, 32 R

[56] References Cited
FOREIGN PATENTS OR APPLICATIONS
1,958,732   6/1970   Germany.......................... 123/25 C Primary Examiner—Al Lawrence Smith
Attorney—Holman & Stern

[57] ABSTRACT

A fuel injection system for an internal combustion engine including a pump which delivers fuel through a pipeline to an injection nozzle mounted on the engine. Also provided is a stepped cylinder which accommodates a complementarily stepped piston. The wider end of the cylinder is open to the aforesaid pipe line and the narrower end of the cylinder communicates with a source of fluid. A conduit is provided and through which fluid from the narrower end of the cylinder is displaced during inward movement of the piston, the displaced fluid eventually flowing to the engine.

6 Claims, 3 Drawing Figures

INJECTION SYSTEM FOR INTERNAL COMBUSTION ENGINE

BACKGROUND OF THE INVENTION

This invention relates to a fuel injection system for internal combustion engine and of the kind comprising a pump arranged to deliver fuel at high pressure in timed relationship with the associated engine and a fuel injection nozzle which is connected to the pump and which is mounted on the engine so that fuel is delivered to a combustion space of the engine.

OBJECT AND SUMMARY OF THE INVENTION

The object of the invention is to provide for a system of the kind specified, means whereby water or other fluid can be delivered to the combustion space of the engine.

Generally, the invention provides a fuel injection system for internal combustion engines provided with a fuel pump in timed relationship with the associated engine and a fuel injection nozzle communicating with the pump and mounted on the engine so that fuel is delivered to a combustion space of the engine and comprising a cylinder, a piston slidable within the cylinder, resilient means loading the piston towards one end of the cylinder, said one end of the cylinder in use, being connected to the pump so that the piston will be subjected to the pressure of fuel supplied to the nozzle and will be moved thereby against the action of the resilient means, valve means for admitting water or other fluid to the other end of the cylinder and said other end of the cylinder in use, communicating with a conduit through which water displaced from said other end of the cylinder can flow to the combustion space of the engine.

Three examples of injection systems in accordance with the invention will now be described with reference to the accompanying drawings in which drawings:

DETAILED DESCRIPTION OF THE EMBODIMENTS

Figure 1:
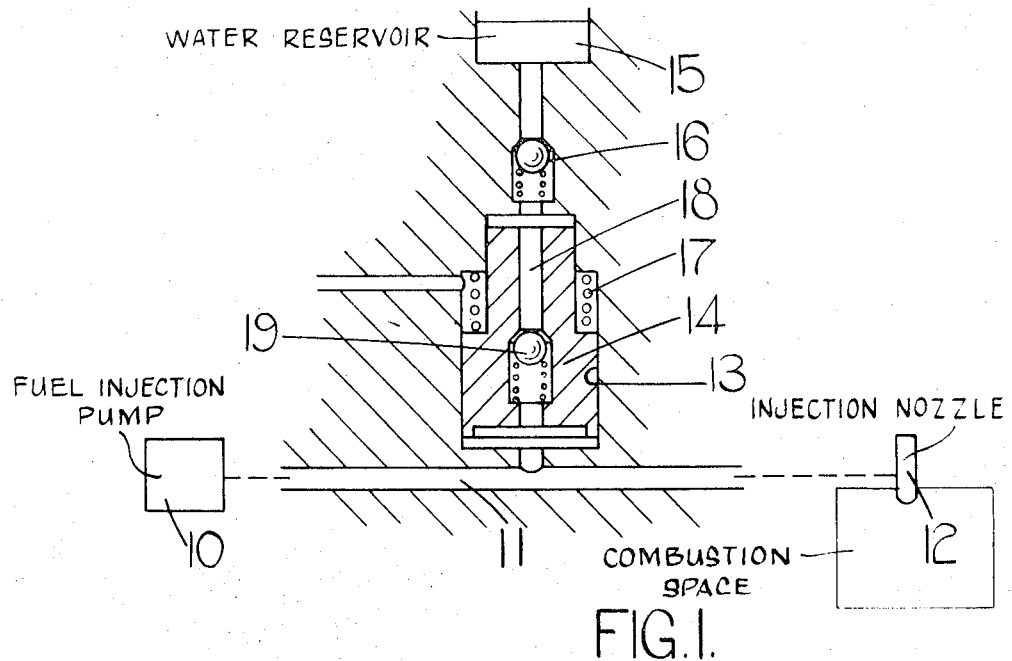
FIGS. 1-3 are diagrammatic views partly in cross-section and partly in elevation respectively illustrating three embodiments of the invention.

Referring to FIG. 1, there is provided a fuel injection pump 10 which is driven in timed relationship with an associated engine E and the pump delivers fuel at high pressure through a pipe line 11 to an injection nozzle 12 mounted on the associated engine at a position so that fuel will be delivered to a combustion space of the engine.

Also provided is a stepped cylinder 13 in which is slidably mounted a complementarily shaped piston 14. The wider end of the cylinder communicates with the pipe line 11 and the narrower end of the cylinder communicates with a reservoir 15 of water or other fluid, by way of a non-return valve 16. In addition, the piston 14 is urged towards the wider end of the cylinder by means of resilient means in the form of a coiled compression spring 17 and this spring is located between the step in the cylinder and the step in the piston. Moreover, the annular space thus defined communicates with a low pressure.

Extending between the wider and narrower ends of the piston is a conduit 18 in which is located a non-return valve 19 and the arrangement is such that when the pump 10 delivers fuel at high pressure to the injection nozzle 12, the piston will be displaced against the action of its spring owing to the fuel pressure acting on the wider end thereof. The effect of this is to pressurize the water in the narrower end of the cylinder and with the valve 16 closed, the water flows by way of the conduit 18 into the wider end of the cylinder, the valve 19 being opened during this time. When the pump ceases to deliver fuel at high pressure and the pressure in the pipe line 11 falls, the spring 17 returns the piston towards the wider end of the cylinder and during this movement, the valve 19 closes and the valve 16 opens to admit a fresh charge of water into the narrower end of the cylinder. Moreover, during the movement of the piston, the mixture of fuel and water in the wider end of the cylinder are displaced into the pipe line 11 for injection into the engine at the next injection stroke. The injection nozzle 12 is of the conventional type and employs a fuel pressure actuated and spring loaded valve member.

Figure 2:
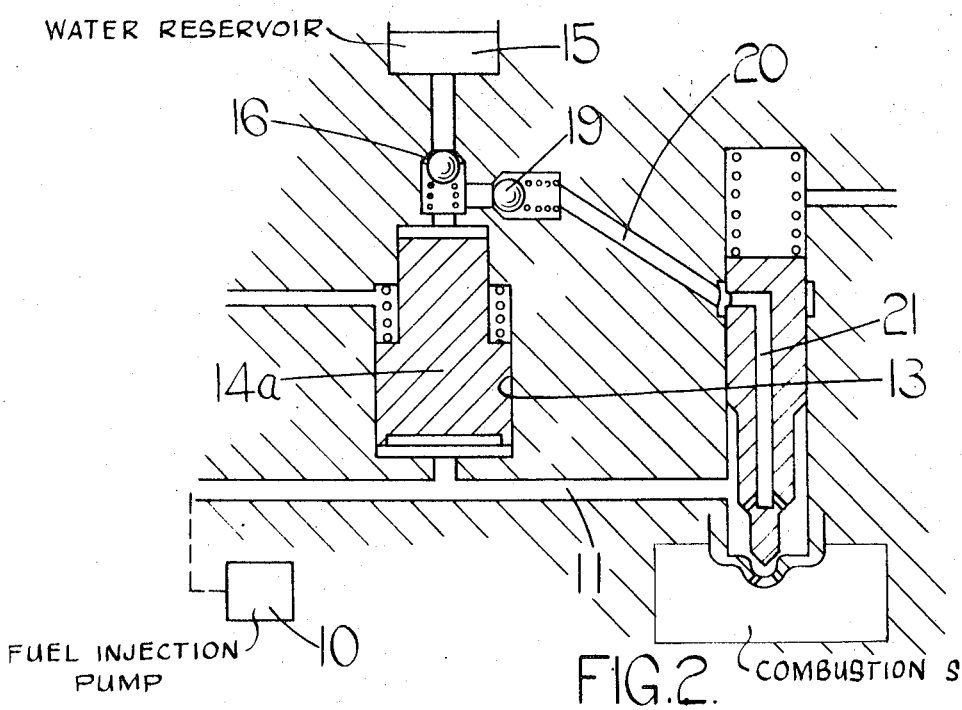

In the arrangement shown in FIG. 2, identical reference numerals are used wherever possible. The cylinder 13 is connected as before to the pipe line 11 and to the water reservoir by way of the valve 16 but the piston 14a is not provided with the conduit. Instead, the narrower end of the cylinder communicates, by way of a conduit 20, with a passage 21 formed in the valve member of the injection nozzle. The passage 21 terminates in the fuel gallery of the injection nozzle and to which the pipe line 11 is connected.

The conduit 20 contains the non-return valve 19. In this example, therefore, the water is mixed with the fuel within the injection nozzle and not in the pipe line 11.

Figure 3:
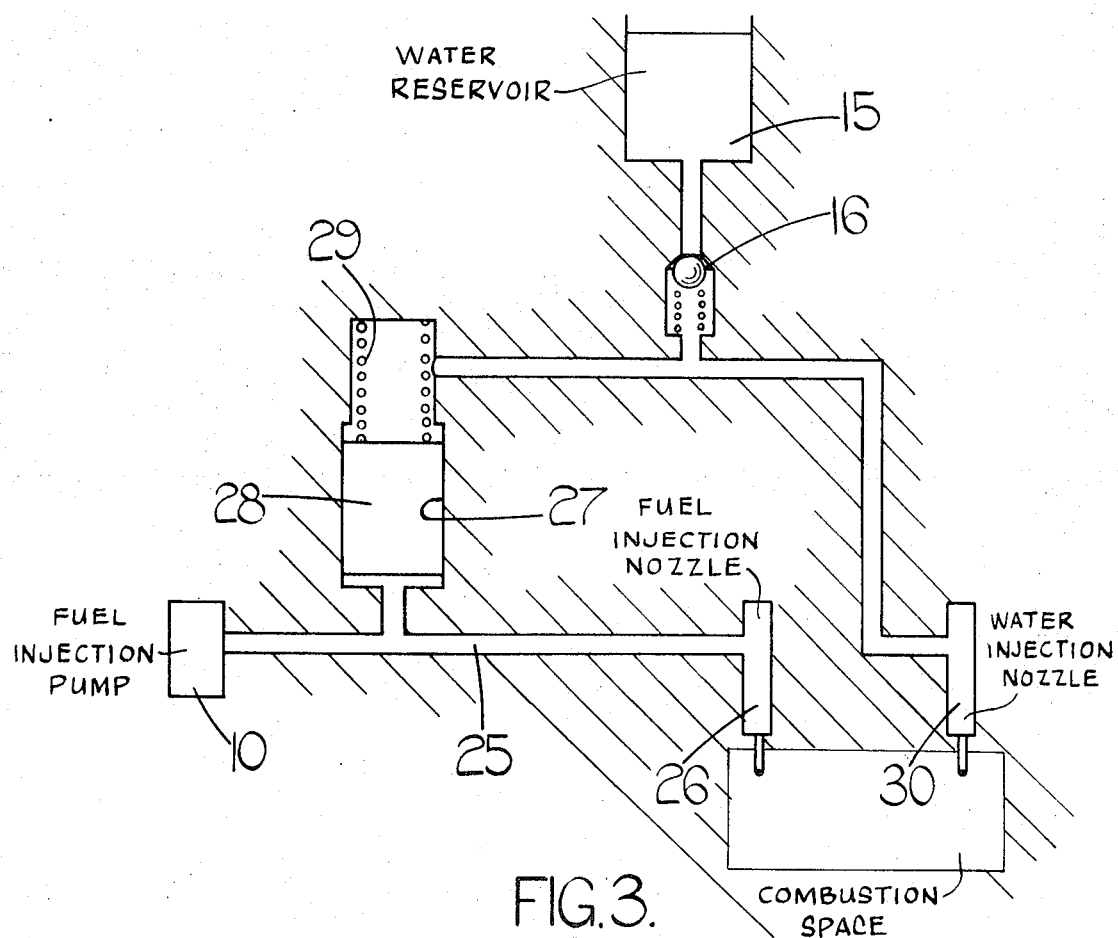

Referring now to FIG. 3 there is provided a pump 10 which supplies fuel by way of a pipe line 25 to a fuel injector 26 which is disposed to direct fuel into the combustion space of the engine. The pipe line 25 communicates with one end of a cylinder 27 in which is mounted a piston 28. The piston 28 is urged towards the end of the cylinder which communicates with the pipe line 25, by means of a coiled compression spring 29. The other end of the cylinder communicates with a water injection nozzle 30 which includes a spring loaded valve element. In addition, the end of the cylinder containing the spring communicates with a water reservoir 15 by way of a non-return valve 16. In operation, fuel supplied by the pump acts upon the piston 28 and moves it against the action of its spring 29. During this movement, fuel is displaced from the end of the cylinder containing the spring and is supplied to the combustion space of the engine by way of the water injection nozzle 30. When the supply of fuel from the pump ceases and the pressure in the pipe line 25 falls, the spring 29 returns the piston 28 to its original position and the valve 16 opens to allow water to flow into the cylinder.

In each of the above arrangements, water is injected with the fuel and this results in a lower combustion temperature of fuel thereby minimizing the quantity of smoke contained in the exhaust gases of the engine. In each of the examples above, the quantity of water which is injected can be varied by making the stroke of the water displacing piston a function of the peak pressure generated by the pump 10. For this purpose, the springs which load the respective pistons, are provided with a high rate so that the full stroke of the piston only occurs at maximum injection pressure.

I claim:

1. A fuel injection system for internal combustion engines and comprising a fuel pump in timed relationship with the associated engine and a fuel injection nozzle communicating with the pump and mounted on the engine so that fuel is delivered to a combustion space of the engine, the system also comprising a cylinder, a piston slidable within the cylinder, resilient means loading the piston towards one end of the cylinder, said one end of the cylinder in use, being connected to the pump so that the piston will be subjected to the pressure of fuel supplied to the nozzle and will, be moved thereby against the action of the resilient means, valve means for admitting water or other fluid to the other end of the cylinder and said other end of the cylinder in use, communicating with a conduit through which water displaced from said other end of the cylinder can flow to the combustion space of the engine.

2. A system as claimed in claim 1 including further valve means in said conduit said further valve means being opened to permit the water or other fluid to flow along said conduit during movement of the piston against the action of its resilient loading.

3. A system as claimed in claim 2 said cylinder being of stepped form and the piston being of complementary shape, said conduit extending from the narrower end of the cylinder.

4. A system as claimed in claim 3 in which said conduit extends between the narrower and wider ends of the piston.

5. A system as claimed in claim 3 in which the conduit terminates at the fuel injection nozzle.

6. A system as claimed in claim 3 in which said conduit communicates with a further injection nozzle mounted on the engine.

* * * * *